US 6,851,163 B2

(12) United States Patent
Selby

(10) Patent No.: US 6,851,163 B2
(45) Date of Patent: Feb. 8, 2005

(54) AXIAL ADJUSTABLE TIE-DOWN STRETCH CORD TERMINUS

(75) Inventor: Ricky W. Selby, Danielson, CT (US)

(73) Assignee: Keeper Corporation, North Windham, CT (US)

( * ) Notice: Subject to any disclaimer, the term of this patent is extended or adjusted under 35 U.S.C. 154(b) by 0 days.

(21) Appl. No.: 10/676,403

(22) Filed: Oct. 1, 2003

(65) Prior Publication Data

US 2004/0060155 A1 Apr. 1, 2004

Related U.S. Application Data

(63) Continuation of application No. 10/242,264, filed on Sep. 12, 2002, now abandoned.

(51) Int. Cl.[7] .......................... A44B 13/00; A44B 21/00; F16G 11/00; F16B 2/00
(52) U.S. Cl. .......................... 24/598.4; 24/130; 24/300; 24/537; 24/595.1; 24/907; 114/218
(58) Field of Search ........................... 24/598.4, 598.5, 24/265 H, 130, 68 CD, 300, 595.1, 905, 907; 114/218; 119/776

(56) References Cited

U.S. PATENT DOCUMENTS

| | | | | |
|---|---|---|---|---|
| 4,178,661 A | * | 12/1979 | Klein | 24/130 |
| 4,368,999 A | * | 1/1983 | Morel | 24/537 |
| 4,432,121 A | * | 2/1984 | Dupre | 24/300 |
| 4,622,724 A | * | 11/1986 | Dupre | 24/130 |
| 4,998,495 A | * | 3/1991 | Bos et al. | 114/218 |
| 5,317,788 A | * | 6/1994 | Esposito et al. | 24/300 |
| 5,596,791 A | * | 1/1997 | Parsons | 24/130 |
| 5,682,652 A | * | 11/1997 | Brody et al. | 24/300 |
| D409,899 S | * | 5/1999 | Schrader | D8/367 |
| D417,386 S | * | 12/1999 | Huston | D8/367 |
| D458,831 S | | 6/2002 | Selby | |
| 6,401,309 B1 | * | 6/2002 | Yang | 24/130 |

* cited by examiner

Primary Examiner—Victor Sakran
(74) Attorney, Agent, or Firm—M. P. Williams

(57) ABSTRACT

A terminus (8) for a bungee cord (15) has a hook (9) with a transverse axis (17) which is within a given distance of the longitudinal axis (16) of a bore (13) within the stem (10) of the terminus. A cleat (24) opens into a cord passage (20) leading to the bore (13) to permit pulling a cord (15) into the cleat (24) thereby locking the terminus in position on the cord (15). The relative axial alignment of the load in the cord (15) with the transverse axis (17) of the hook (9) prevents the load (15) from rotating the hook substantially. A land (27) adjusts the thickness of the cleat.

4 Claims, 1 Drawing Sheet

FIG.1
FIG.3
FIG.2
FIG.5
FIG.4
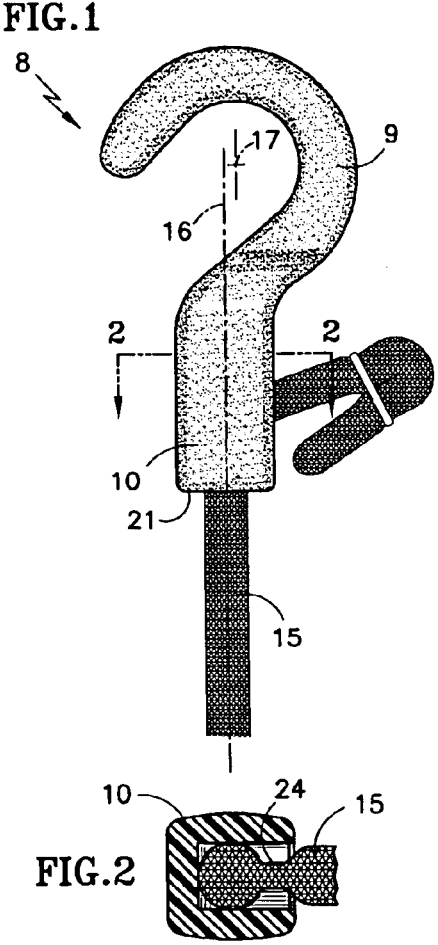
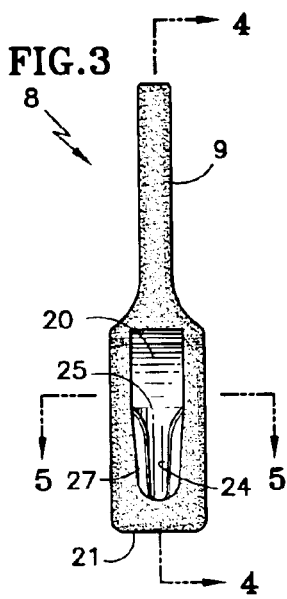
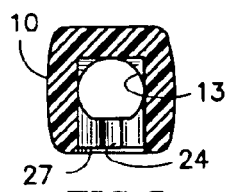
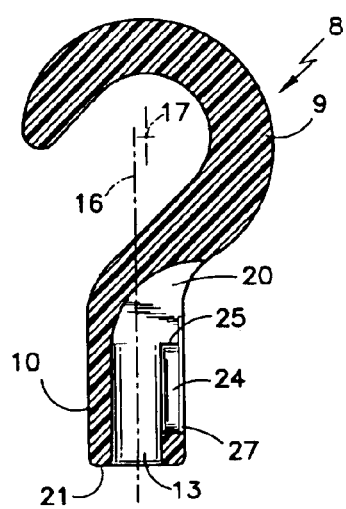

AXIAL ADJUSTABLE TIE-DOWN STRETCH CORD TERMINUS

RELATED APPLICATION

This application is a continuation of application Ser. No. 10/242,264 filed Sep. 12, 2002 abandoned.

TECHNICAL FIELD

This invention relates to a terminus for stretch cord, such as may be used for tie-downs, the position of which is adjustable along the stretch cord; the parts of the terminus are so positioned that loads applied thereto by the stretch cord are transferred to substantially the center of the hook thereon.

BACKGROUND ART

A widely used adjustable tie-down stretch cord is disclosed in U.S. Pat. No. 5,682,652. Therein, a terminus for the stretch cord may be positioned anywhere along the stretch cord, the stretch cord thereafter being locked into a cleat which is formed in a stem portion of the terminus. A hook extends from the opposite side of the stem for the cleat. One problem with this terminus is that axial loads imparted to the cleat, when the cord is locked therein, pull the hook in a manner which tends to cause it to rotate. Stated more simply, the load is not applied to the center of the hook. A similar result obtains in an adjustable hook for bungee cord described in U.S. Pat. No. Des. 417,386 in which the bungee cord becomes locked to the terminus at the backside of the hook, the cord extending substantially tangentially of the hook, through a cam on the back side of the hook. The load applied by the cord therefor tends to rock the hook. Some hooks suitable for use with bungee cord provide the load axially to the hook, but these are not adjustable. Examples are: U.S. Pat. Nos. Des. 409,899, 4,622,724, 5,317,788.

DISCLOSURE OF INVENTION

Objects of the invention include a stretch cord terminus, the position of which can be adjusted along a stretch cord or bungee cord, the cord then being locked to the terminus at the selected position: which transfers the bungee cord load substantially axially to the hook of the terminus; which does not involve rotation of the hook as a result of loads imparted thereto; and which provides improved performance in use.

According to the present invention, the axis of a generally circular hook on an axial, adjustable tie-down stretch cord terminus is within a predetermined distance of the longitudinal axis of a cord receiving bore in the stem of the terminus.

The invention transfers loads applied by the bungee cord to substantially the center of the hook so that the hook does not rotate in response to the load, as is common in prior art adjustable stretch cord termini.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 1 is a side elevation view of a terminus according to the present invention.

FIG. 2 is a top plan section taken on the line 2—2 of FIG. 1.

FIG. 3 is a rear elevation view of the terminus of FIG. 1.

FIG. 4 is a side elevation section taken on the line 4—4 in FIG. 3.

FIG. 5 is a top plan section taken on the line 5—5 of FIG. 3.

MODE(S) FOR CARRYING OUT THE INVENTION

Referring to FIG. 1, the terminus 8 comprises a hook 9 integrally joined with a stem 10. The hook has a generally cylindrical shape as illustrated in FIGS. 1 and 4 and opens toward a first side (to the left in FIGS. 1 and 4) of the terminus 8. The hook 9 defines a first end of the terminus 8 and the upper end as seen in FIGS. 1, 3 and 4.

The stem 10 defines a second end of the terminus 8, the lower end in FIGS. 1, 3 and 4, and has a cord receiving bore 13 extending from the second end, the diameter being suitable to receive a stretch cord 15 with which the terminus is to be utilized. The longitudinal axis 16 of the bore 13 is within a predetermined distance of the transverse axis 17 of the hook.

A cord passage 20 extends outwardly from the bore 13 at a distance from a second end 21 of the terminus 8. A cleat 24 opens at 25 into the cord passage 20 in such a fashion that when a cord extends through the bore 13 and passage 20 it may be pulled down into the cleat 24, as illustrated in FIG. 1, thereby locking the terminus to the cord.

A land 27 may be provided, if desired, to reduce the thickness of the anvil, to give the anvil a desired characteristic.

All of the aforementioned patents are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. An axial, adjustable tie-down stretch cord terminus, having a first side and a second side opposite from said first side, comprising a one-piece molded plastic body including:

a generally circular hook with a transverse axis, said hook defining a first end of said terminus; and a cord receiving stem integrally attached to said hook and defining a second end of said terminus, said stem having a cord receiving bore, extending from said second end, with a longitudinal axis and a diameter suitable to receive a stretch cord with which said terminus is to be used;

an extension of said longitudinal axis being within a predetermined distance of said transverse axis, said predetermined distance being less than said diameter;

said hook opening at said first side of said terminus;

said stem having a cord passage extending outwardly from said bore, a distance from said second end, on said second side of said terminus; and a cord-gripping cleat formed in said second side of said stem, said cleat opening into said cord passage, the inner edge of said cleat communicating with said bore so that a cord passing through said bore and through said cord passage can be pulled at least partially from said passage into said cleat, thereby force directed away from said terminus in a cleated cord will be transferred to said hook along a line within said predetermined distance of said transverse axis.

2. A terminus according to claim 1 wherein:

the wall of said bore is flat on either side of said cleat.

3. A terminus according to claim 1 wherein:

said longitudinal axis is on said first side of said transverse axis.

4. A terminus according to claim 1 wherein:

there being a land on the second side of said cleat to adjust the thickness of said cleat.

\* \* \* \* \*

UNITED STATES PATENT AND TRADEMARK OFFICE
CERTIFICATE OF CORRECTION

PATENT NO. : 6,851,163 B2
DATED : February 8, 2005
INVENTOR(S) : Ricky W. Selby

It is certified that error appears in the above-identified patent and that said Letters Patent is hereby corrected as shown below:

Column 2,
Line 27, "anvil" (two places) should read -- cleat --.

Signed and Sealed this

Sixteenth Day of August, 2005

JON W. DUDAS
*Director of the United States Patent and Trademark Office*